(12) United States Patent
Kawagoe et al.

(10) Patent No.: US 7,808,755 B2
(45) Date of Patent: Oct. 5, 2010

(54) ELECTRONIC CONTROL UNIT

(75) Inventors: Jun Kawagoe, Shizuoka-ken (JP);
Tsuneaki Endou, Shizuoka-ken (JP);
Mitsuyoshi Shimazaki, Shizuoka-ken (JP); Mitsugu Koike, Sizuoka-ken (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 514 days.

(21) Appl. No.: 11/945,286

(22) Filed: Nov. 27, 2007

(65) Prior Publication Data
US 2008/0122643 A1 May 29, 2008

(30) Foreign Application Priority Data
Nov. 27, 2006 (JP) .............................. 2006-318575

(51) Int. Cl.
*H02H 3/00* (2006.01)
(52) U.S. Cl. ............................ 361/86; 361/33; 340/660
(58) Field of Classification Search ................ 340/660; 361/86, 83, 88
See application file for complete search history.

(56) References Cited

U.S. PATENT DOCUMENTS

| 4,284,053 | A | * | 8/1981 | Merrick | 123/497 |
| 5,703,410 | A | * | 12/1997 | Maekawa | 290/40 C |
| 6,085,733 | A | * | 7/2000 | Motoyama et al. | 123/636 |
| 6,357,418 | B1 | * | 3/2002 | Uemura et al. | 123/406.58 |
| 6,575,143 | B2 | * | 6/2003 | Uemura et al. | 123/490 |
| 6,807,949 | B2 | * | 10/2004 | Kishibata et al. | 123/497 |
| 6,853,295 | B2 | * | 2/2005 | Takebe et al. | 340/426.11 |
| 7,156,064 | B2 | * | 1/2007 | Namari et al. | 123/179.3 |
| 7,400,111 | B2 | * | 7/2008 | Kishibata et al. | 320/104 |

FOREIGN PATENT DOCUMENTS

JP 8-33228 2/1996

* cited by examiner

*Primary Examiner*—Eric M Blount
(74) *Attorney, Agent, or Firm*—Pearne & Gordon LLP (57) ABSTRACT

There is provided an electronic control unit including: input terminals connected to output terminals of a magneto generator driven by an engine; DC output terminals; a control power supply circuit that converts an AC voltage input between the input terminals into a DC voltage equal to a set value; and a microprocessor that controls electrical components of the engine, wherein the electronic control unit further includes an interruption signal generation circuit that compares an output voltage of the control power supply circuit with a certain abnormality determination voltage and generates an interruption signal when the output voltage of the control power supply circuit becomes the abnormality determination voltage or less, and an abnormality state storage unit for storing that an abnormality occurs in a power supply portion when the interruption signal is generated.

7 Claims, 4 Drawing Sheets

ELECTRONIC CONTROL UNIT

TECHNICAL FIELD OF THE INVENTION

The present invention relates to an electronic control unit having a function of supplying a power supply voltage to various loads using a magneto generator driven by an engine or the like as a power supply, and controlling a specific object to be controlled.

PRIOR ART OF THE INVENTION

In an engine that drives a vehicle or the like, various electrical components such as a fuel injection device or an ignition device are driven using a magneto generator driven by the engine as a power supply.

Recently, an electronic control unit (ECU) including, as a unit, a microprocessor and a drive circuit that drives various electrical components or the like has been used for controlling electrical components of the engine. The electrical components attached to the engine is driven by a certain DC voltage, and thus when a magneto generator is used as a power supply, a control power supply circuit that converts an AC voltage output by the magneto generator into a certain DC voltage is provided in the electronic control unit.

The control power supply circuit that converts an AC voltage output by the magneto generator into a certain DC voltage is comprised of a rectifier circuit that rectifies the output voltage of the magneto generator, and means for short-circuiting an output of the generator when an output voltage of the rectifier circuit exceeds a set value. Such a control power supply circuit is disclosed in, for example, Japanese Patent Application Laid-Open Publication No. 8-33228.

Figure 4:
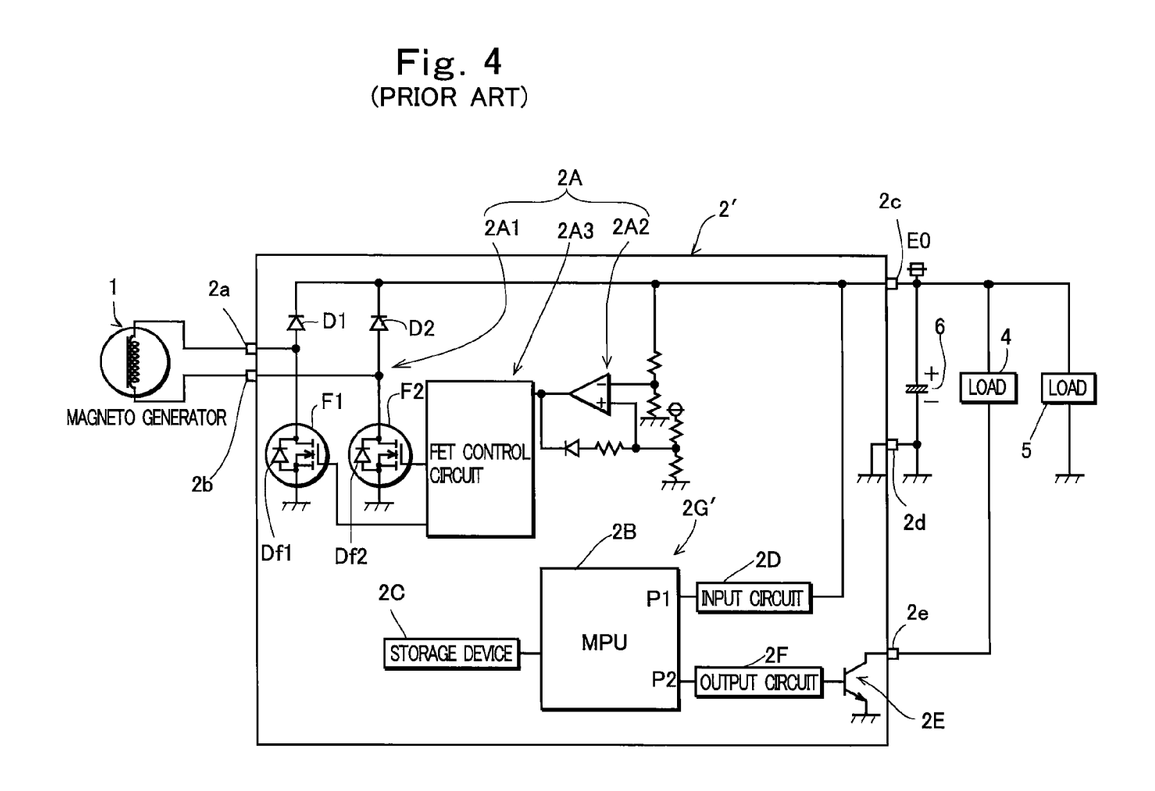
FIG. 4 is a schematic circuit diagram of an exemplary construction of a conventional electronic control unit.

FIG. 4 shows an exemplary construction of an electronic control unit including the control power supply circuit disclosed in Japanese Patent Application Laid-Open Publication No. 8-33228. In FIG. 4, a reference numeral 1 denotes a magneto generator, 2' denotes an electronic control unit, and 4 and 5 denote loads that operate using the output voltage of the control power supply circuit as a power supply voltage. The load 4 is controlled by the electronic control unit, and the load 5 requires no control.

The electronic control unit 2' comprises input terminals 2a and 2b into which the output voltage of the magneto generator is input, positive and negative DC output terminals 2c and 2d, and a load connection terminal 2e to which the load that requires control is connected. Among the DC output terminals 2c and 2d, the negative output terminal 2d is grounded, and a smoothing capacitor 6 is connected between the output terminals 2c and 2d.

The electronic control unit 2' also comprises a control power supply circuit 2A that converts an AC voltage input between the input terminals 2a and 2b into a DC voltage maintained substantially at a set value and supplies the voltage between the DC output terminals 2c and 2d, a microprocessor (MPU) 2B, a storage device 2C connected to the microprocessor B, an input circuit 2D that detects an output voltage of the control power supply circuit 2A and inputs the voltage into a port P1 of the microprocessor, a load drive switch 2E connected between the load connection terminal 2e and the ground, and an output circuit 2F that provides a drive signal output from a port P2 of the microprocessor to the load drive switch 2E.

The load 4 that requires control is connected between the output terminal 2c and the load connection terminal 2e, and the load 5 is connected between the positive DC output terminal 2c and the ground. In this example, a control portion 2G' that controls a specific object to be controlled (the load 4 in the shown example) is comprised of the microprocessor (MPU) 2B, the storage device 2C, the input circuit 2D, the load drive switch 2E, and the output circuit 2F.

The control power supply circuit 2A is comprised of a control rectifier circuit 2A1 comprised of diodes D1 and D2 and MOSFETs F1 and F2, an output voltage determination circuit 2A2 that detects an output voltage of the control rectifier circuit and determines whether the detected voltage is a set value or less, and an FET control circuit 2A3. The FET control circuit 2A3 controls the MOSFETs F1 and F2 so as to simultaneously provide drive signals to the MOSFETs F1 and F2 to simultaneously turn on the MOSFETs when the output voltage determination circuit 2A2 determines that the output voltage of the control rectifier circuit exceeds the set value, and to stop providing the drive signals to the MOSFET F1 and F2 and maintain the MOSFETs in an off state when the output voltage determination circuit 2A2 determines that the output voltage is the set value or less.

In the electronic control unit in FIG. 4, the output voltage of the magneto generator 1 is rectified by a diode bridge full-wave rectifier circuit comprised of the diodes D1 and D2 and parasitic diodes Df1 and Df2 formed between drains and sources of the MOSFETs F1 and F2, and applied between the DC output terminals 2c and 2d.

When the output voltage determination circuit 2A2 determines that the output voltage of the control power supply circuit 2A exceeds the set value, the FET control circuit 2A3 simultaneously provides the drive signals to the MOSFETs F1 and F2 to simultaneously turn on the MOSFETs. When the MOSFETs F1 and F2 are simultaneously turned on, the output voltage of the magneto generator is short-circuited through between the drain and the source of one of the MOSFETs F1 and F2 and the parasitic diode of the other, thereby reducing the output voltage of the control rectifier circuit 2A1. When the output voltage of the control rectifier circuit thereby becomes the set value or less, the provision of the drive signals from the FET control circuit to the MOSFETs F1 and F2 is stopped. This releases the short circuit of the output voltage of the magneto generator and increases the output voltage of the control rectifier circuit. Repeating these operations allows the voltage between the output terminals 2c and 2d to be maintained at around the set value.

In the electronic control unit, if expansion or contraction by vibration or heat of the engine causes a poor contact of contact points of a connector that connects the magneto generator and the control unit or a poor wire connection in the unit, the output of the control power supply circuit is abnormally reduced, and the operations of the electrical components temporarily stop to cause a malfunction of the engine or stop the engine.

Thus, in the conventional electronic control unit, the output voltage of the control power supply circuit 2A is input into the microprocessor 2B through the input circuit 2D, the output voltage of the control power supply circuit is sampled at a certain sampling cycle, and when it is detected that the output voltage of the control power supply circuit becomes significantly lower than the set value, it is determined that some abnormality occurs in a power supply portion comprised of the magneto generator 1 and the control power supply circuit 2A, and a warning or the like is issued.

As described above, in the conventional electronic control unit, the microprocessor monitors the output voltage of the control power supply circuit at a certain sampling cycle, and when the output voltage of the control power supply circuit becomes significantly lower than the set value, it is determined that the abnormality occurs in the power supply portion. In the case where the abnormality in the power supply portion is detected in this manner, when an abnormality that the state where the output voltage of the control power supply circuit is reduced continues for a sampling cycle time or longer, the abnormality can be reliably detected, while when an instantaneous abnormality occurs that continues for a time shorter than the sampling cycle time, the abnormality cannot be detected.

Thus, conventionally, when the abnormality in the power supply portion causes a malfunction of the engine, it cannot be identified that the malfunction results from the abnormality in the power supply portion in some cases, which requires additional operations such as disassembly of a normal electrical component or the like for repairing the engine, and takes time for repairing the engine.

A sufficiently reduced sampling cycle time of the output voltage of the control power supply circuit can prevent the above described problem. However, the reduced sampling cycle time of the output voltage of the control power supply circuit increases a load on the microprocessor, and affects control of ignition timing and a fuel injection amount performed by the microprocessor.

SUMMARY OF THE INVENTION

An object of the present invention is to provide an electronic control unit that can reduce a sampling cycle time of a control power supply circuit by a microprocessor, properly monitor an output voltage of the control power supply circuit without applying a heavy load on the microprocessor, and reliably detect an abnormality that occurs in a power supply portion.

The present invention is applied to an electronic control unit comprising: input terminals connected to output terminals of a magneto generator driven by an engine; DC output terminals; a control power supply circuit that is comprised so as to convert an AC voltage input between the input terminals into a DC voltage maintained substantially at a set value and provide the voltage between the DC output terminals, and constitutes a power supply portion together with the magneto generator; and a control portion that comprises a microprocessor and controls a specific object to be controlled by the microprocessor.

In the present invention, an interruption signal generation circuit is provided that generates an interruption signal when an output voltage of the control power supply circuit becomes an abnormality determination voltage or less and inputs the interruption signal into the microprocessor, and the control portion comprises abnormality state storage means for storing that an abnormality occurs in the power supply portion when the interruption signal is generated.

Comprised as described above, the interruption signal can be generated immediately when the output voltage of the control power supply circuit is abnormally reduced to detect that the abnormality occurs in the power supply portion, irrespective of a sampling cycle of the output voltage of the control power supply circuit by the microprocessor, thereby, even when an instantaneous abnormality occurs in the power supply portion, the abnormality can be reliably detected to store the occurrence of the abnormality in the abnormality state storage means. Thus, when a malfunction of the engine is observed, the occurrence of the abnormality in the power supply portion can be reliably found by checking the contents of storage in the abnormality state storage means. When the abnormality in the power supply portion occurs, it can be prevented that the abnormality is misidentified as an abnormality in an electrical component other than the power supply portion to perform an additional operation such as checking a normal electrical component, and a proper repair operation of the engine can be performed.

When a battery is connected between the DC output terminals, even if an abnormality occurs in the power supply portion comprised of the magneto generator and the control power supply circuit, the output voltage of the control power supply circuit is not significantly reduced in some cases, and the abnormality in the power supply portion cannot be properly detected. Thus, the present invention is particularly useful when applied to an electronic control unit that controls a batteryless engine including no battery in a load connected between output terminals.

In a preferred aspect of the present invention, a communication port to which an external computer is connected is provided, and communication means is provided for transmitting the present abnormality state of the power supply portion and an abnormality history stored in the abnormality state storage means to the external computer according to requests of the external computer when the external computer is connected to the communication port.

Comprised as described above, the external computer is connected to the electronic control unit to allow communication between the external computer and the microprocessor in the electronic control unit thereby, whether the abnormality occurs in the power supply portion at present, and also a history of past abnormality occurrences can be found.

In a preferred aspect of the present invention, an abnormality state display device that displays the presence or absence of the abnormality in the power supply portion is provided, and the control portion comprises display device drive means for causing the abnormality state display device to perform a display operation when the interruption signal is generated.

As described above, the abnormality state display means is provided to allow whether the abnormality occurs in the power supply portion to be immediately found without connecting the external computer.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF THE PREFERRED EMBODIMENTS

Now, an embodiment of the present invention will be described in detail with reference to the drawings.

Figure 1:
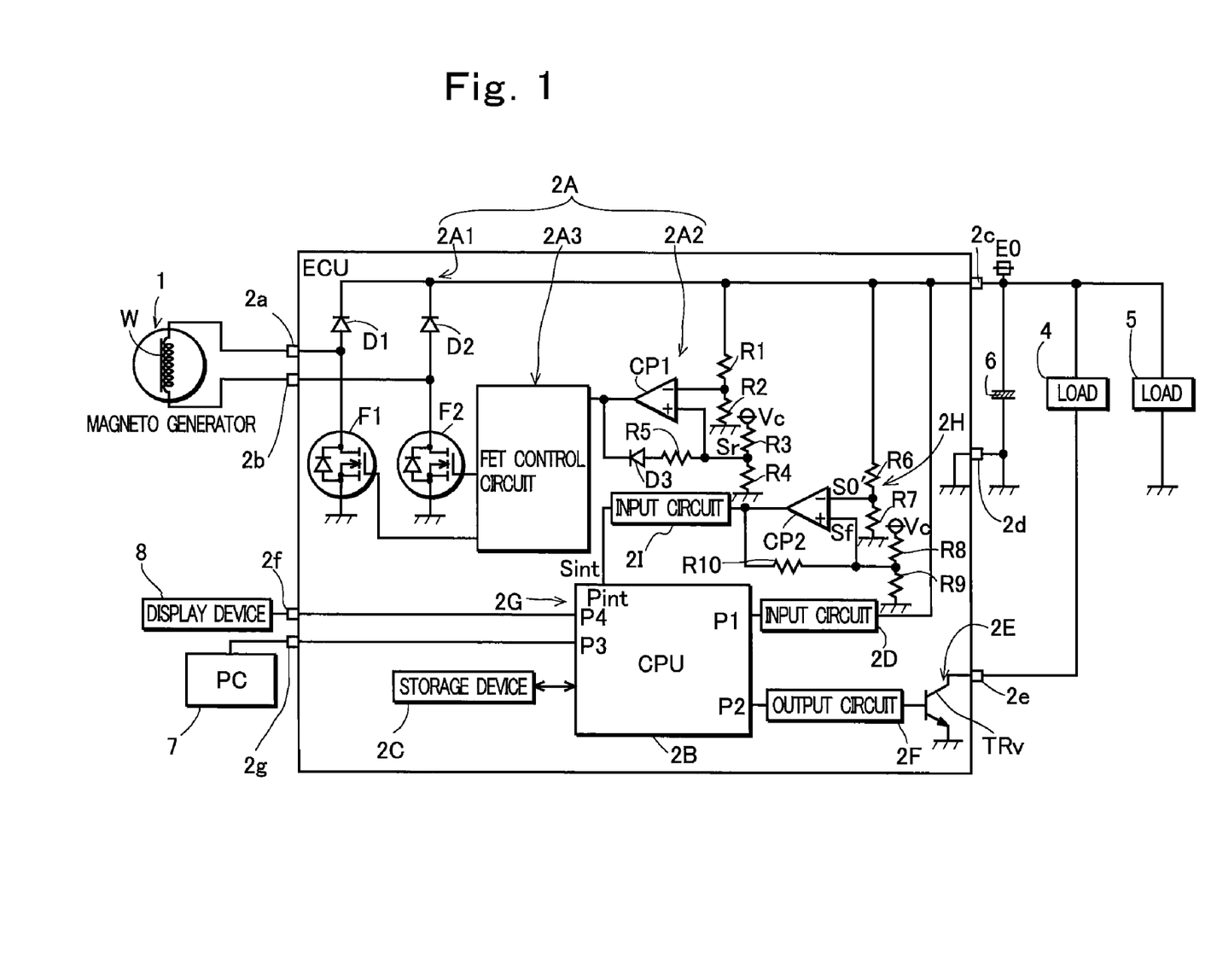
FIG. 1 is a schematic circuit diagram of an exemplary construction of an embodiment of the present invention.

FIG. 1 shows an exemplary construction of a preferred embodiment of the present invention. In FIG. 1, a reference numeral 1 denotes a magneto generator, 2 denotes an electronic control unit according to the present invention, and 4 and 5 denote loads that operate using an output voltage of a control power supply circuit as a power supply voltage. In the embodiment, the loads in the control power supply circuit include no battery.

As well known, the magneto generator 1 is comprised of a magneto rotor mounted to an output shaft of an engine, and a stator secured to a case or a cover of the engine. The stator is comprised of an armature core having a magnetic pole portion facing a magnetic pole of the magneto rotor, and a magneto coil W wound around the armature core. The load 4 is controlled by the electronic control unit, and the load 5 requires no control. In the following description, the load 4 is an injector of a fuel injection device.

The electronic control unit 2 comprises, as in a conventional example in FIG. 4, input terminals 2a and 2b into which the output voltage of the magneto generator is input, positive and negative DC output terminals 2c and 2d, and a load connection terminal 2e to which the load that requires control is connected. The negative output terminal 2d is grounded, and a smoothing capacitor 6 is connected between the output terminals 2c and 2d.

The load (injector) 4 that requires control is connected between the positive DC output terminal 2c and the load connection terminal 2e, and the load 5 that requires no control is connected between the positive DC output terminal 2c and the ground.

The electronic control unit 2 also comprises a control power supply circuit 2A that converts an AC voltage input between the input terminals 2a and 2b into a DC voltage maintained substantially at a set value and supplies the voltage between the DC output terminals 2c and 2d, a microprocessor (MPU) 2B, a storage device 2C connected to the microprocessor B, an input circuit 2D that detects an output voltage of the control power supply circuit 2A and inputs the voltage into a port P1 of the microprocessor, a load drive switch 2E connected between the load connection terminal 2e and the ground, an output circuit 2F that provides a drive signal output from a port P2 of the microprocessor to the load drive switch 2E, an interruption signal generation circuit 2H, and an input circuit 2I that inputs an interruption signal generated by the interruption signal generation circuit 2H into the microprocessor 2B. A control portion 2G that controls a specific object to be controlled (the injector 4 in the shown example) is comprised of the microprocessor 2B, the storage device 2C, the input circuit 2D, the load drive switch 2E, the output circuit 2F, the power supply portion output voltage determination circuit 2H, and the input circuit 2I.

The control power supply circuit 2A is comprised of a control rectifier circuit 2A1 comprised of a bride circuit of diodes D1 and D2 and MOSFETs F1 and F2, an output voltage determination circuit 2A2 that detects an output voltage of the control rectifier circuit 2A1 and determines whether the detected voltage is a set value or less, and an FET control circuit 2A3 that controls the MOSFETs according to determination results of the output voltage determination circuit.

The FET control circuit 2A3 controls the MOSFETs F1 and F2 so as to simultaneously provide drive signals to the MOSFETs F1 and F2 to simultaneously turn on the MOSFETs when the output voltage determination circuit 2A2 determines that the output voltage of the control rectifier circuit exceeds the set value, and to stop providing the drive signals to the MOSFET F1 and F2 and maintain the MOSFETs in an off state when the output voltage determination circuit 2A2 determines that the output voltage is the set value or less.

The shown output voltage determination circuit 2A is comprised of resistors R1 to R5, a comparator CP1, and a diode D3, a voltage detection circuit that detects the output voltage of the control power supply circuit 2A and outputs a voltage detection signal So is comprised of a DC circuit of the resistances R1 and R2, and a set voltage signal generation circuit is comprised of a DC circuit of the resistances R3 and R4. The set voltage signal generation circuit comprised of the DC circuit of the resistances R3 and R4 divides an output voltage Vc of an unshown constant voltage power supply circuit that converts the output voltage of the control power supply circuit 2A into a certain DC voltage, to generate a set voltage signal Sr.

The voltage detection signal So output by the voltage detection circuit is input into an inverting input terminal of the comparator CP1, and the set voltage signal Sr output by the set voltage signal generation circuit is input into a non-inverting input terminal of the comparator CP1. A DC circuit of the diode D3 and the resistance R5 is connected between an output terminal and the non-inverting input terminal of the comparator CP1, and when the potential of the output terminal of the comparator CP1 is reduced, the reduction in the potential is fed back to the non-inverting input terminal of the comparator CP1 to reduce the set voltage signal Sr.

In the shown control power supply circuit 2A, when the output voltage of the control rectifier circuit 2A1 is the set value or less, a voltage value of the output voltage detection signal So is a voltage value of the set voltage signal Sr or less, and thus the potential of the output terminal of the comparator CP1 is at a high level. At this time, the FET control circuit 2A3 does not provide the drive signals to the MOSFETs F1 and F2, and thus the MOSFETs are maintained in an off state, and a rectified output of the magneto generator is applied as it is between the output terminals 2c and 2d.

When the output voltage of the control power supply circuit 2A exceeds the set value, and the voltage detection signal So exceeds the set voltage signal Sr, the potential of the output terminal of the comparator CP1 changes to a low level. When the potential of the output terminal of the comparator CP1 changes to the low level, the change in the potential is fed back to the non-inverting input terminal of the comparator CP1 through the diode D3 and the resistance R5 to reduce the set voltage signal Sr by a certain level.

When the voltage detection signal So exceeds the set voltage signal Sr, and the potential of the output terminal of the comparator CP1 changes to the low level, the FET control circuit 2A3 simultaneously provides the drive signals to the MOSFETs F1 and F2 to simultaneously turn on the MOSFET. When the MOSFETs F1 and F2 are simultaneously turned on, the output voltage of the magneto generator is short-circuited through between the drain and the source of one of the MOSFETs F1 and F2 and a parasitic diode of the other, thereby reducing the output voltage of the control rectifier circuit 2A1. When the output voltage of the control rectifier circuit thereby becomes the set value or less, the potential of the output terminal of the comparator CP1 changes to a high level, and the provision of the drive signals from the FET control circuit to the MOSFETs F1 and F2 is stopped. This releases the short circuit of the output voltage of the magneto generator and increases the output voltage of the control rectifier circuit. Repeating these operations allows the voltage between the output terminals 2c and 2d to be maintained at around the set value.

The input circuit 2D inputs the output voltage of the control power supply circuit 2A into the port P1 of the microprocessor 2B. The microprocessor 2B reads the voltage input into the port P1 at a certain sampling cycle, detects the output voltage of the control power supply circuit, and reflects the detected voltage in the control of the load.

For example, when an amount of fuel injected from the fuel injection device is controlled, the injector is controlled so as to inject fuel of the amount arithmetically operated with respect to various control conditions. Generally, the amount of fuel injected from the injector is controlled by a time for injecting fuel from the injector (an injection time), and thus the microprocessor controls a time for applying a driving voltage to the injector so as to inject fuel from the injector for a predetermined injection time. In this case, the time for applying the driving voltage to the injector (a driving time) is determined by an actual injection time that is an injection time required for setting an air/fuel ratio of an air/fuel mixture to a predetermined value, and an ineffective injection time. The ineffective injection time is determined mainly from a time between timing of the start of application of the driving voltage to the injector and timing of the actual start of the fuel injection. The ineffective injection time is determined by the level of a power supply voltage supplied to the injector, and thus the microprocessor arithmetically operates the ineffective injection time with respect to a voltage value sampled through the input circuit 2D, and the ineffective injection time is added to the actual injection time separately arithmetically operated to determined the time for applying the driving voltage to the injector.

In a conventional electronic control unit, the presence or absence of an abnormality in a power supply portion is determined from a voltage value sampled through an input circuit 2D. However, in the case where the presence or absence of the abnormality in the power supply portion is determined using the voltage value sampled through the input circuit 2D, an instantaneous abnormality that continues only for a time shorter than a sampling cycle time cannot be detected in some cases when occurring in the power supply portion.

Thus, in the present invention, the interruption signal generation circuit 2H is separately provided that compares the output voltage Eo of the control power supply circuit 2A with a certain abnormality determination voltage Ef, generates an interruption signal when the output voltage of the control power supply circuit becomes the abnormality determination voltage or less, and provides the interruption signal to an interruption input port Pint of the microprocessor, and abnormality state storage means for storing that the abnormality occurs in the power supply portion in a nonvolatile memory in the storage device 2C when the interruption signal is issued is constructed by the microprocessor 2B. Comprised as described above, whether the abnormality occurs in the power supply portion can be determined by checking the contents of storage in the abnormality state storage means.

The shown interruption signal generation circuit 2H is comprised of a comparator CP2 and resistors R6 to R10. In the shown interruption signal generation circuit 2H, the resistances R6 and R7 are connected in series, and the output voltage Eo of the control power supply circuit is applied across a DC circuit of these resistances. An output voltage detection circuit is comprised of the DC circuit of the resistances R6 and R7, and a voltage detection signal So' obtained across the resistance R7 is input into an inverting input terminal of the comparator CP2.

Resistances R8 and R9 are connected in series, and an output voltage Vc of an unshown constant voltage power supply circuit is applied across a DC circuit of these resistances. An abnormality determination signal generation circuit that generates an abnormality determination signal Sf of the size corresponding to the abnormality determination voltage is comprised of the DC circuit of the resistances R8 and R9, and the abnormality determination signal Sf obtained across the resistance R9 is input into a non-inverting input terminal of the comparator CP2.

A resistance R10 is connected between an output terminal and the non-inverting input terminal of the comparator CP2. An output of the comparator CP2 is input into the interruption input terminal Pint of the microprocessor through the input circuit 2I. The input circuit 2I inputs a signal with an inverted output of the comparator CP2 into the interruption input terminal Pint of the microprocessor as an interruption signal Sint.

Figure 3:
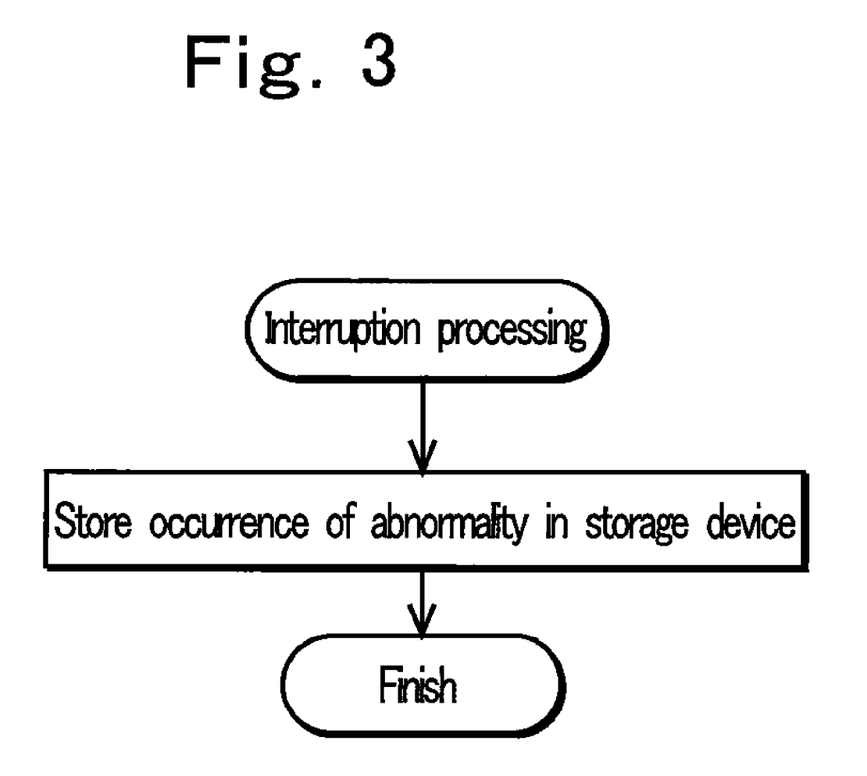
FIG. 3 is a flowchart showing an algorithm of an interruption processing performed by a microprocessor when an interruption signal generation circuit generates an interruption signal in the embodiment.

In the shown interruption signal generation circuit 2H, when the power supply portion is normal and the output voltage Eo of the control power supply circuit exceeds the abnormality determination voltage Ef, the potential of the output terminal of the comparator CP2 is at a low level, and the interruption signal generation circuit 2H generates no interruption signal. At this time, the input circuit 2I sets the potential of the interruption input terminal Pint of the microprocessor to a high level. When the output voltage Eo of the control power supply circuit becomes the abnormality determination voltage Ef or less, the potential of the output terminal of the comparator CP2 changes to a high level, and the interruption signal generation circuit 2H generates the interruption signal. At this time, the input circuit 2I sets the potential of the interruption signal input terminal Pint of the microprocessor to a low level and inputs the interruption signal Sint into the microprocessor. The microprocessor 2B performs an interruption processing in FIG. 3 when the interruption signal is input, and causes the nonvolatile memory in the storage device 2C to store the occurrence of the abnormality in the power supply portion together with the occurrence time of the abnormality. The microprocessor constructs the abnormality state storage means in the process of performing the interruption processing in FIG. 3.

The microprocessor 2B comprises a communication port P3 to which an external computer is connected, and a terminal 2g connected to the communication port is provided in a case of the electronic control unit 2. A communication port of the external computer 7 is connected to the terminal 2g to allow communication between the external computer 7 and the microprocessor 2B. The microprocessor 2B performs a predetermined program to construct communication means for transmitting the present abnormality state of the power supply portion and an abnormality history stored in the abnormality state storage means to the external computer according to requests of the external computer.

A display device connection terminal 2f connected to an output port P4 of the microprocessor is also provided in the case of the electronic control unit 2, and a display device 8 comprised of an LED or the like is connected to the terminal 2f. The microprocessor provides a drive signal to the display device 8 when detecting that the abnormality occurs in the power supply portion (when the interruption signal Sint is input), and causes the display device 8 to perform a display operation for displaying that the abnormality occurs in the power supply portion.

The microprocessor 2B performs predetermined programs to construct various control means for controlling the electrical components of the engine. In the shown example, the load 4 is the injector, and the load drive switch 2E is provided in the electronic control unit 2 for controlling application of the power supply voltage to the injector. The shown load drive switch 2E is comprised of an NPN transistor TRv having a collector connected to the load connection terminal 2e and a grounded emitter, and a drive signal Sd is provided to a base of the transistor TRv from the port P2 of the microprocessor through the output circuit 2F. The drive signal Sd is a pulse signal having a time width corresponding to the sum of an ineffective injection time and an effective injection time, and the transistor TRv maintains an on state while receiving the drive signal, and applies the output voltage Eo of the control power supply circuit to the injector 4 as the power supply voltage.

Figure 2A:
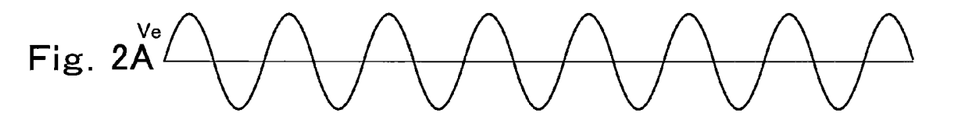
FIGS. 2A to 2F are waveform charts of voltage waveforms of various parts in FIG. 1.
Figures 2B, 2C:
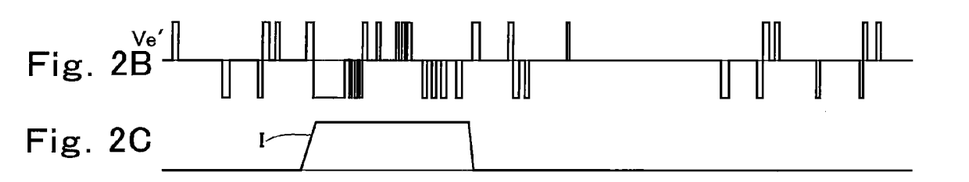
Figure 2D:
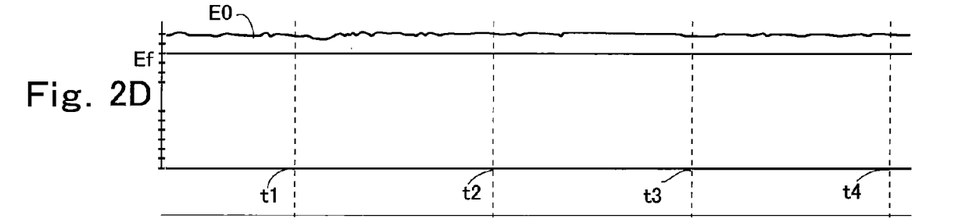
Figure 2E:
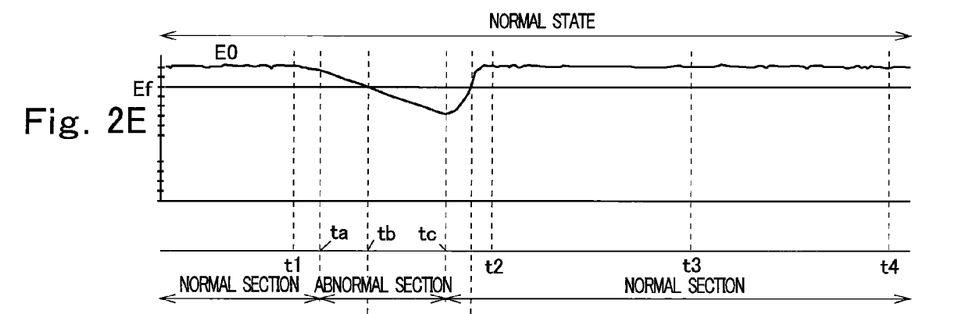
Figure 2F:
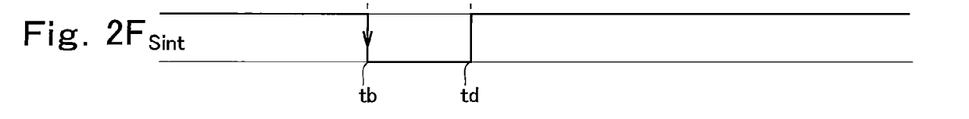

FIGS. 2A to 2F show voltage signals of various parts of the electronic control unit 2 in FIG. 1. FIG. 2A shows a waveform of an output voltage Ve in a non-control time of the magneto generator 1 applied between the input terminals 2a and 2b, and FIG. 2B shows a waveform of an output voltage Ve' in a control time. FIG. 2C shows a current I passing through the load 4, and FIG. 2D shows an output voltage Eo in a normal time of the control power supply circuit. Further, FIG. 2E shows an output voltage Eo in an abnormal time of the control power supply circuit, and FIG. 2F shows the interruption signal Sint. In FIGS. 2A to 2F, t1, t2, ... denote sampling timings for the microprocessor to sample the output voltage of the control power supply circuit through the input circuit 2D.

When no abnormality occurs in the power supply portion, the microprocessor provides the drive signal Sd to the load drive switch 2E to turn on the transistor and TRv, and thus the output voltage Eo of the control power supply circuit is applied to the injector 4 as the power supply voltage. When no abnormality occurs in the power supply portion, the output voltage Eo of the control power supply circuit 2A is merely slightly reduced when the load current I passes as shown in FIG. 2C, and the output voltage Eo does not become the abnormality determination voltage Ef or less as shown in FIG. 2D.

On the other hand, when the abnormality occurs in the power supply portion, for example, when the abnormality occurs in the power supply portion in a period from time ta to time tc, the output voltage Eo of the control power supply circuit is reduced as shown in FIG. 2E, and the output voltage Eo becomes the abnormality determination voltage Ef or less at the time tb. When the output voltage Eo becomes the abnormality determination voltage Ef or less, the potential of the output terminal of the comparator CP2 changes from the low level to the high level, the change in the potential is inverted by the input circuit 2I, and the interruption signal Sint falling from the high level to the low level is input into the interruption input terminal Pint of the microprocessor as shown in FIG. 2F. At this time, the microprocessor 2B performs the interruption processing in FIG. 3, and causes the nonvolatile memory in the storage device 2C to store the occurrence of the abnormality in the power supply portion together with the occurrence time of the abnormality.

When the abnormality in the power supply portion is eliminated at the time tc, the output voltage Eo increases. When the output voltage Eo exceeds the abnormality determination voltage Ef at time td, the potential of the output terminal of the comparator CP2 changes from the high level to the low level. At this time, the input circuit 2I sets the potential of the interruption input terminal Pint of the microprocessor to the high level to cancel the interruption signal Sint.

As in the examples in FIGS. 2A to 2F, when the abnormality in the power supply portion occurs in a period between the sampling timings t1 and t2, the abnormality cannot be detected by a conventional method. On the other hand, according to the present invention, the interruption signal Sint can be generated immediately when the output voltage of the control power supply circuit is abnormally reduced to detect that the abnormality occurs in the power supply portion, and the occurrence of the abnormality can be stored in the storage device, irrespective of a sampling cycle of the output voltage of the control power supply circuit by the microprocessor. Thus, when a malfunction of the engine is observed, the occurrence of the abnormality in the power supply portion can be reliably found by checking the contents of storage in the abnormality state storage means, and it can be prevented that the abnormality in the power supply portion is misidentified as an abnormality in an electrical component other than the power supply portion to perform an additional operation such as checking a normal electrical component.

In the embodiment, the injector only is exemplified as the load to be controlled by the microprocessor, but other electrical component loads required for rotating the engine such as an ignition device may be, of course, controlled by the microprocessor.

The control power supply circuit used in the present invention may be a circuit that converts an AC voltage input between input terminals 2a and 2b into a DC voltage maintained substantially at a set value, and is not limited to the circuit used in the embodiment.

Although the preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. An electronic control unit comprising:
    input terminals connected to output terminals of a magneto generator driven by an engine;
    DC output terminals;
    a control power supply circuit that is comprised so as to convert an AC voltage input between said input terminals into a DC voltage maintained substantially at a set value and provide the voltage between said DC output terminals, and constitutes a power supply portion together with said magneto generator; and
    a control portion that comprises a microprocessor and controls a specific object to be controlled by said microprocessor,
    wherein said electronic control unit further comprises an interruption signal generation circuit that generates an interruption signal when an output voltage of said control power supply circuit becomes a set abnormality determination voltage or less and inputs said interruption signal into said microprocessor, and
    said control portion comprises abnormality state storage means for storing that an abnormality occurs in said power supply portion when said interruption signal is generated.

2. The electronic control unit according to claim 1, wherein a load connected between said output terminals is a load other than a battery.

3. The electronic control unit according to claim 1, wherein said control portion comprises a communication port to which an external computer is connected, and communication means for transmitting the present abnormality state of said power supply portion and an abnormality history stored in said abnormality state storage means to said external computer according to requests of the external computer when the external computer is connected to said communication port.

4. The electronic control unit according to claim 2, wherein said control portion comprises a communication port to which an external computer is connected, and communication means for transmitting the present abnormality state of said power supply portion and an abnormality history stored in said abnormality state storage means to said external computer according to requests of the external computer when the external computer is connected to said communication port.

5. The electronic control unit according to claim 1, further comprising an abnormality state display device that displays the presence or absence of the abnormality in said power supply portion, wherein said control portion comprises display device drive means for causing said abnormality state display device to perform a display operation when said interruption signal is generated.

6. The electronic control unit according to claim 2, further comprising an abnormality state display device that displays the presence or absence of the abnormality in said power supply portion, wherein said control portion comprises display device drive means for causing said abnormality state display device to perform a display operation when said interruption signal is generated.

7. The electronic control unit according to claim 3, further comprising an abnormality state display device that displays the presence or absence of the abnormality in said power supply portion, wherein said control portion comprises display device drive means for causing said abnormality state display device to perform a display operation when said interruption signal is generated.

* * * * *